(12) United States Patent
Beneker et al.

(10) Patent No.: US 7,585,248 B2
(45) Date of Patent: Sep. 8, 2009

(54) HINGE MOUNTING FOR AN ADJUSTMENT DEVICE OF A MOTOR VEHICLE SEAT

(75) Inventors: Wilfried Beneker, Leichlingen (DE); Burckhard Becker, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 399 days.

(21) Appl. No.: 11/584,159

(22) Filed: Oct. 20, 2006

(65) Prior Publication Data

US 2007/0093355 A1  Apr. 26, 2007

(30) Foreign Application Priority Data

Oct. 20, 2005  (DE)  ......... 10 2005 050 673

(51) Int. Cl.
*F16H 57/08*  (2006.01)
*F16H 55/18*  (2006.01)
*F16H 13/14*  (2006.01)

(52) U.S. Cl. .......... 475/347; 475/195; 74/409
(58) Field of Classification Search .......... 475/347, 475/345, 195, 335; 74/409
See application file for complete search history.

(56) References Cited

U.S. PATENT DOCUMENTS

| | | | | |
|---|---|---|---|---|
| 3,081,648 A | * | 3/1963 | Duer | 475/345 |
| 4,799,403 A | * | 1/1989 | Dinkel et al. | 475/335 |
| 4,882,943 A | * | 11/1989 | Pipon et al. | 74/409 |
| 5,183,447 A | * | 2/1993 | Kawakita | 475/341 |
| 5,336,137 A | * | 8/1994 | Kawakita | 475/347 |
| 5,704,870 A | * | 1/1998 | Shephard | 475/342 |
| 7,153,230 B2 | * | 12/2006 | Ai | 475/166 |

FOREIGN PATENT DOCUMENTS

| | | |
|---|---|---|
| DE | 3201309 | 7/1983 |
| DE | 10327090 | 12/2004 |

* cited by examiner

*Primary Examiner*—Tisha D Lewis
(74) *Attorney, Agent, or Firm*—McCarter & English, LLP

(57) ABSTRACT

A hinge mounting for an adjustment device of a motor vehicle seat having a first external gear wheel comprising a first inner toothed surface and a second external gear wheel comprising a second inner toothed surface. At least two planet wheels mesh with both the first and second inner toothed surfaces. A driving toothed sun wheel meshes with the at least two planet wheels. At least one of the planet wheels has a ring-shaped spring forming the toothed surface of the plane wheel that is radially elastically deformable and permanently exert a force onto the sun wheel, the first inner toothed surface and the second inner toothed surface; and/or the sun wheel comprises a ring-shaped spring forming at least a portion of the toothed surface of the sun wheel and configured to be radially elastically deformable and permanently exert a force onto the planet wheels and bias these with force into abutment with the first and second inner toothed surfaces.

10 Claims, 3 Drawing Sheets

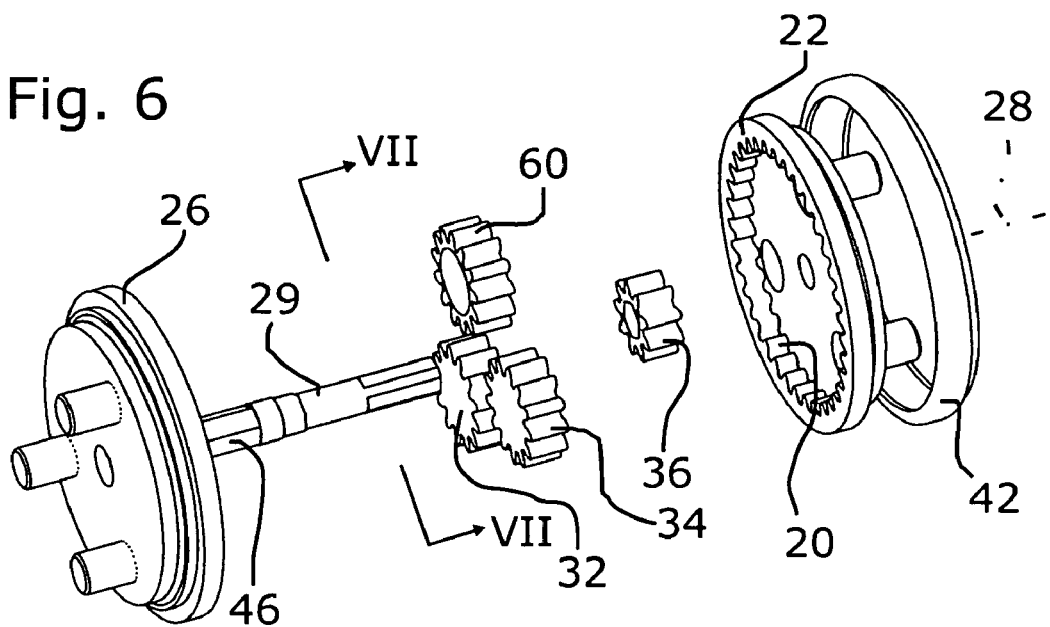
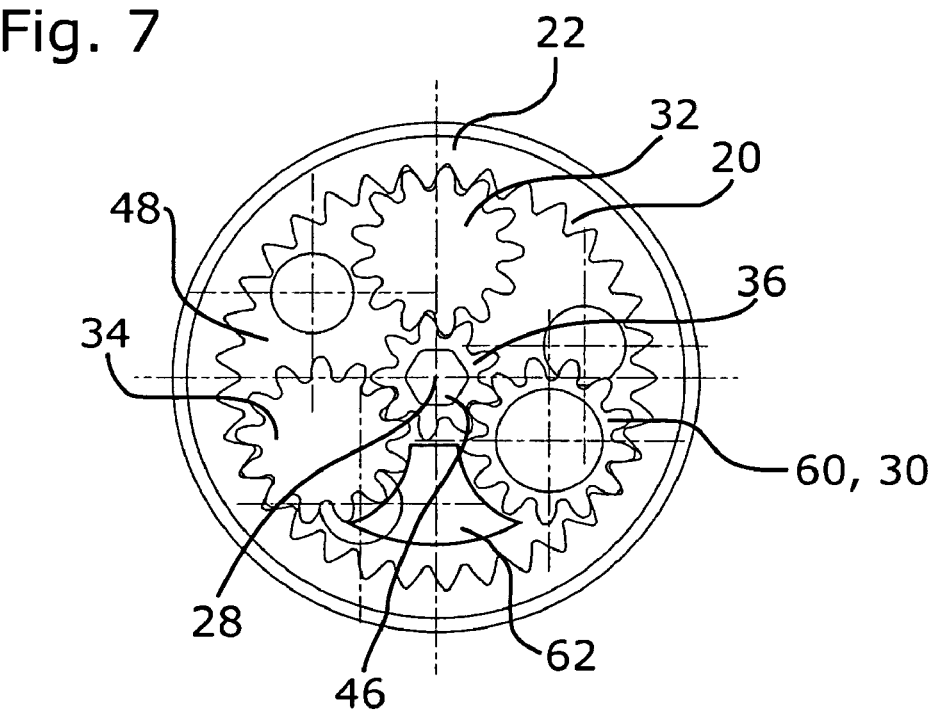

HINGE MOUNTING FOR AN ADJUSTMENT DEVICE OF A MOTOR VEHICLE SEAT

CROSS REFERENCE TO RELATED APPLICATIONS

This application claims priority to German Application No. DE10 2005 050 673.9, filed Oct. 20, 2005, the contents of which are expressly incorporated by reference in their entirety as part of the present disclosure.

BACKGROUND

The invention relates to a hinge mounting for an adjustment device of a motor vehicle seat. The hinge mounting has a first external gear wheel with a first inner toothed surface and a second external gear wheel with a second inner toothed surface, with the two external gear wheels being adjustable relative to each other about a hinge axis. The hinge mounting further has at least two planet wheels that mesh with both the first external gear wheel and the second external gear wheel and are each disposed for rotation about a planet wheel axis. A driving sun wheel has a toothed surface and meshes with the at least two planet wheels.

Numerous such type hinge mountings have been previously proposed and are notoriously used; examples of such hinge mountings are disclosed by U.S. Pat. No. 5,183,447, DE 3201309 C2 and DE 103 27 090 A1.

In such type hinge mountings, precise meshing of at least one of the planet wheels with the two inner toothed surfaces of the external gear wheels is necessary for providing hinge mountings with zero clearance. Such a hinge mounting being typically used for the reclining angle adjustment of a seat back of a motor vehicle seat and the seat back constituting a quite long lever arm, the hinge mounting must be provided with sufficient clearance to prevent perceivable play from occurring at the upper edge of the seat back.

This is where the invention comes to bear. It is an object of the invention to further develop the hinge mounting of the type mentioned herein above so that the two external gear wheels are retained with zero clearance, at any rate with the least possible clearance, by at least one of the planet wheels for the hinge mounting to have a zero clearance fit.

SUMMARY

In view of the hinge mounting of the type mentioned herein above, this object is solved by providing a hinge mounting for an adjustment device of a motor vehicle seat comprising: a first external gear wheel defining a first inner toothed surface, a second external gear wheel defining a second inner toothed surface and being rotatable and adjustable about a hinge axis relative to the first inner toothed surface, at least two planet wheels, each meshing with both the first inner toothed surface and the second inner toothed surface and being disposed for free rotation about a planet wheel axis, and a driving sun wheel that comprises a toothed surface and meshes with the at least two planet wheels.

Additionally, at least one of the planet wheels has a ring-shaped spring or is formed from a ring-shaped spring, that the ring-shaped spring forms at least partially the toothed surface of the planet wheel, is configured to be radially elastically deformable and designed in such a manner that the ring-shaped spring permanently exerts a force both onto the sun wheel and onto the first inner toothed surface and onto the second inner toothed surface, and/or that the sun wheel has a ring-shaped spring, that the ring-shaped spring forms at least a portion of the toothed surface of the sun wheel, is configured to be radially elastically deformable and designed such that the ring-shaped spring permanently exerts a force onto the planet wheels and biases these with force into abutment with the first inner toothed surface and the second inner toothed surface.

In the mounted condition, the ring-shaped spring has no prescribed shape; it rather changes its shape with each adjustment and permanently during one adjustment. It springs outward in radial direction. In the mounted condition and in contrast to the toothed surface of the sun wheel or of one planet wheel known from prior art, this spring generally will not adopt a circular shape but will rather adopt different shapes and conditions. The ring-shaped spring is designed so that it has to be mounted using an ancillary device. It must be pushed radially inward by means of an ancillary device at the location of the planet wheels and of the sun wheel respectively as well as of the inner toothed surfaces. Once the ancillary device has been removed, the ring-shaped spring springs radially outward, thus providing a zero clearance fit between at least some tooth pairs, preferably between all the tooth pairs of the hinge mounting.

In one embodiment of the present invention, the ring-shaped spring of the sun wheel has a diameter corresponding to the diameter of an inner circle about the hinge axis, the inner circle being tangent or intersecting dedendum circles of the planet wheels; and/or the ring-shaped spring of at least one of the planet wheels has a diameter that is equal to or slightly greater than the difference between the diameters of the dedendum circle of the sun wheel and of the dedendum circles of the inner toothed surfaces.

The backlash compensation of the invention is achieved in that the ring-shape spring is overdimensioned in comparison to a mountable rigid part and is configured and designed to be so elastic to permanently exert a force onto the parts being in engagement therewith and to urge them into zero clearance engagement, independent of the respective relative position. The shape of the ring-shaped spring changes with the adjustment position of the hinge mounting. It adapts to the respective circumstances. The ring-shaped spring is the elastic means which stores the force needed to urge the toothed surfaces into intermeshing engagement.

In the first alternative, the sun wheel no longer is configured to be rigid and integral as hitherto usual, but rather consists of at least two parts, namely a ring-shaped spring and a driving part. The ring-shaped spring urges the planet wheels so far outward that they are also brought into zero clearance engagement with the two inner toothed surfaces. The driving part may be arranged either within the ring-shaped spring or axially offset beside the ring-shaped spring. In the first case, the ring-shaped spring has e.g., an inner driver region, which engages an outer driver region of the driving part. This engagement may cause the torques to be transferred from the inner part to the ring-shaped spring. Inner and outer part interengage in such a manner through their driver regions that rotational movement can be transferred without the inner part hindering the radial movement of the ring-shaped spring. The ring-shaped spring and the driver part are connected in such a manner that they are allowed to move radially against each other; as far as practicable, they should not be allowed to move against each other in the circumferential direction in order for the rotary drive to be backlash-free. A certain rotational play may occur in the direction of rotation, but measures can be taken thereagainst. In the second case, the ring-shaped spring and an axially shorter sun wheel are arranged closely adjacent each other in an axial side-by-side relationship in accordance with prior art. In both cases, the ring-shaped spring is overdimensioned in comparison to a prior art sun wheel. The driving part has a rotational axis that is determined and may thus be carried for example.

In the second alternative, at least one of the planet wheels has a ring-shaped spring or is formed from a ring-shaped spring. Accordingly, at least one planet wheel no longer is a rigid toothed wheel but is rather formed from the ring-shaped spring and at least one other part, for example an inner piece or an axially shorter prior art planet wheel disposed axially beside the ring-shaped spring. The ring-shaped spring is overdimensioned with respect to a prior art planet wheel. By virtue of the radially elastic design and of the oversize, it pushes itself permanently and forcefully into the two inner toothed surfaces of the external gear wheels on the one side and into the toothed surface of the sun wheel on the other side. In the second alternative, the backlash compensation of the invention is achieved in that, in the mounted condition, the at least one planet wheel permanently exerts a force onto the sun wheel and the inner toothed surfaces, irrespective of the respective relative position.

Both alternatives can be realized simultaneously. Meaning, the hinge mounting may have both at least an elastic ring-shaped planet wheel and a sun wheel with inner part and resilient outer part.

In an improved implementation it is advantageous if the toothed surface of the sun wheel is allowed to move in the radial direction relative to the hinge axis. This can be achieved by a corresponding bearing clearance of the hinge axis. In the second alternative, the sun wheel may also be built from an inner part and an outer part capable of moving radially against each other. The outer part, which carries the toothed surface, may be configured to be a ring-shaped spring, although it may also be a rigid annular gear. The outer part is connected to the hinge shaft by a rubber ring for example, which is a constituent part of the inner part. This makes it possible for the outer part to move relative to the inner part.

The invention allows for a plurality of implementations. Diverse embodiments will be discussed herein after; they are not understood as a limitation but are rather given by way of example.

Involute teeth have proved particularly efficient as intermeshing teeth. At any rate, the teeth should be configured so as to mesh with the respective mating teeth in a manner to abut at their flanks rather than being allowed to reach with the tooth tip the bottom land between two teeth of the mating toothed surface. Accordingly, curved tooth flanks are particularly advantageous.

The force of the ring-shaped spring is designed in such a manner that the teeth of at least one planet wheel are brought into abutment with the inner teeth of the external gear wheels so that the teeth come to rest against at least two flanks showing into opposed directions of rotation of each external gear wheel.

For backlash compensation, the ring-shaped spring is deformed in the radial direction. In order for the ring-shaped spring not to bulge too far outward into the free space between the planet wheels, it is itself configured to be sufficiently rigid and/or there are provided abutting means limiting an unwanted wide radial outward bend of the ring-shaped spring into the free space. Support wheels or guiding parts, which are interposed between the planet wheels, may be provided for this purpose. The free space mentioned is located in the annular gap between the sun wheel and the inner toothed surfaces.

BRIEF DESCRIPTION OF THE DRAWINGS

Other features and advantages will become more apparent upon reviewing the appended claims and the following non restrictive description of embodiments of the invention, given by way of example only with reference to the drawing. In the drawing:

FIG. 6: is a perspective assembly view like FIG. 1, but now for a third embodiment in which one planet wheel is configured to be elastic; and FIG. 7: is a view along VII-VII of FIG. 6.

DETAILED DESCRIPTION

Figure 1:
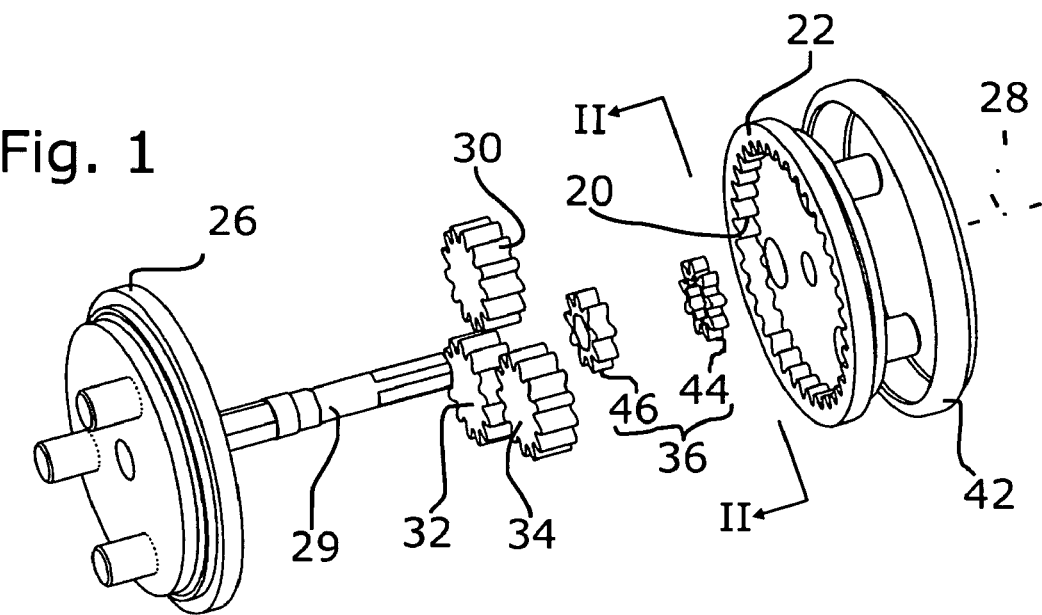
FIG. 1 is a perspective assembly view of a first embodiment with an elastic sun wheel which is axially adjacent to a driving sun wheel.

In a known manner, the hinge mounting has a first external gear wheel 22 provided with a first inner toothed surface 20 and a second external gear wheel 26 provided with a second inner toothed surface 24. The two external gear wheels 22, 26 are rotatable and adjustable relative to each other about a hinge axis 28.

Three planet wheels 30-34 in all mesh with the two toothed external gear wheels 22, 26. Each of them meshes with both the first external gear wheel 22 and with the second external gear wheel 26. The planet wheels 30-34 of the first and the second exemplary embodiment are built identically. In the third exemplary embodiment, the planet wheels 32 and 34 are built identically. The external gear wheels 22, 26 differ by the total number of the teeth of their inner toothed surfaces 20, 24, in the concrete exemplary embodiment, they differ by three teeth. The planet wheels 30-34 mesh with a sun wheel 36; it is driven by means of a hinge shaft 29, with the hinge axis 28 as the axle. For carrying the hinge shaft 29, holes are provided in the external gear wheels 22, 26. It is carried with bearing clearance. The hinge shaft 29 is driven, such as by a motor or a handle, this occurring in a known manner so that both have not been illustrated.

For simplicity's sake, the difference in the number of teeth of the two external gear wheels 22, 26 cannot be seen in detail in the figures; it is known in principle and needs not be illustrated separately.

Each planet wheel 30-34 has a free planet wheel axis 40 about which it rotates in the event of an adjusting movement. There may be provided a guiding part which forms bearing apertures for the bearing journal of the planet wheels 30-34. In principle, a planet wheel 30 needs not be carried on bearings.

In the exemplary embodiments shown, each external gear wheel 22, 26 is formed in a plate-shaped configuration. The inner toothed surfaces 20, 24 are made by embossing. Both have concentric addendum circles 38 and dedendum circles 40. Both further have a concentric edge; the two edges are encompassed and held together by a retainer ring 42. To fasten the hinge mounting to a mechanical adjustment device that has not been illustrated herein, for example between a seat carrier and a seat back, bolts 44 project from the outer side of the external gear wheels 22, 26 to which the corresponding parts can be fastened in a well-known manner.

Figure 2:
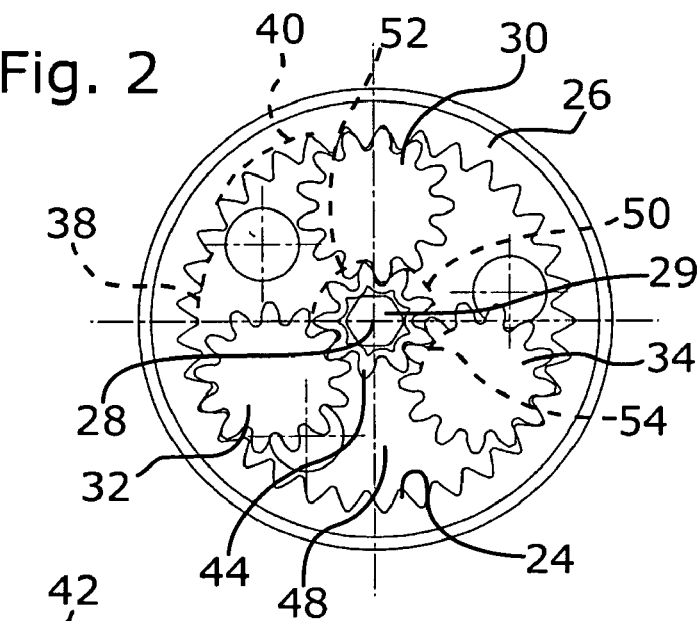
FIG. 2 is a view along the line II-II of FIG. 1.
Figure 3:
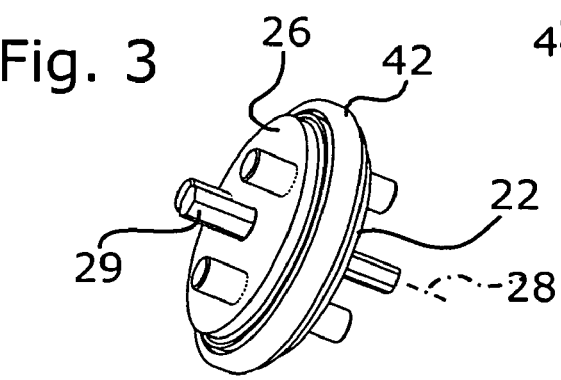
FIG. 3 is a perspective view of the assembled hinge mounting.

In the first exemplary embodiment shown in the FIGS. 1 through 3, the sun wheel 36 is configured to be elastic. For this purpose, the sun wheel 36 comprises a first ring-shaped spring 44 and also has a driving part 46. The driving part is a prior art sun wheel although it has a shorter axial length than a prior art driving wheel, as shown best in FIG. 1. The lacking axial length is occupied by the first ring-shaped spring 44. Both the first ring-shaped spring 44 and the driving part 46 are toothed, both forming together the toothed surface of the sun wheel 36. It is configured to be elastically deformable and dimensioned in such a manner that it permanently exerts a force onto the planet wheels 30-34 and permanently urges these planet wheels 30-34 into abutment against the two inner toothed surfaces 20, 24. For this purpose, the first ring-shaped spring 44 has a certain oversize with respect to the toothed driving part 46; it is slightly larger, e.g., maximally 5%, more specifically maximally 1% larger, than the driving part. Because of the oversize, the first ring-shaped spring 44 cannot be mounted without ancillary means when assembling the hinge mounting. It must be compressed radially. For this purpose, an ancillary device (not shown) is utilized, which radially compresses the first ring-shaped spring 44 at the locations of the planet wheels 30-34. The first ring-shaped spring 44 is deformed thereby. After assembly, the ancillary device is removed. Then, the first ring-shaped spring 44 pushes radially outward so that backlash compensation occurs. The driving part 46, by contrast, is form-fitting and can be mounted without any ancillary means.

The first ring-shaped spring 44 (first and second exemplary embodiment) or a second ring-shaped spring 60 (third exemplary embodiment) is a ring made from a corresponding resilient material, such as spring steel, which has an exterior toothed surface and a wall thickness that has been selected to achieve the desired spring properties whilst providing on the other side for sufficient dimensional stability so that the first ring-shaped spring 44 will not bulge too much into a free space 48. This free space 38 is located between the planet wheels 30-34 and is furthermore defined by the inner toothed surfaces 20, 22 and the toothed surface of the sun wheel 36.

In the assembled condition, the first ring-shaped spring 44 is not as round as a normal gear wheel, it is rather slightly deformed into a triangular shape. The second ring-shaped spring 60 is also deformed; it has an approximately oval shape. The elastic deformation is small though and cannot be readily seen in the Figs. It is intended that the oversize of the first ring-shaped spring 44 or of the second ring-shaped spring 60 should only be large enough for backlash compensation to be achieved. Larger oversize could disturb practical operation. In the assembled condition, the first ring-shaped spring 44 has a diameter 50, concretely, it is an addendum diameter which corresponds to the diameter of an inner circle 52 about the hinge axis 28, comes into contact with the dedendum circles 54 of the planet wheels 30-34 or is slightly larger. "Slightly larger" is understood to refer to an amount of less than 5%, preferably of less than 2% and more specifically less than 1%. This applies in equivalent fashion to the second ring-shaped spring 60.

In the assembled condition, as shown in FIG. 3 for all the implementations, the hinge mounting corresponds to a prior art hinge mounting. Such type hinge mountings are also referred to as round plates.

Figure 4:
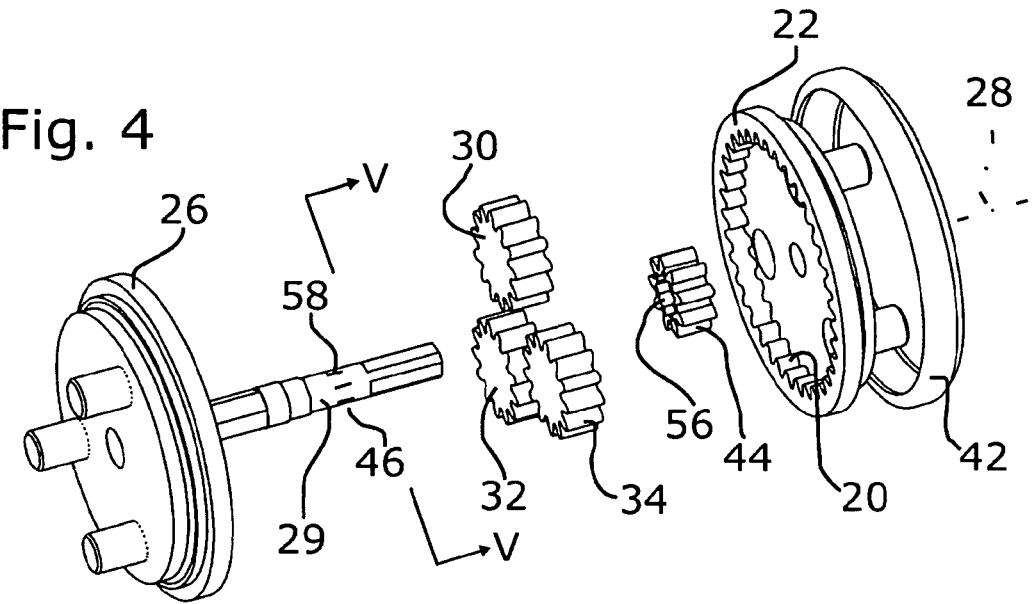
FIG. 4 is a perspective assembly view like FIG. 1, but now for a second embodiment, in which the sun wheel is elastic and has an interior drive.
Figure 5:
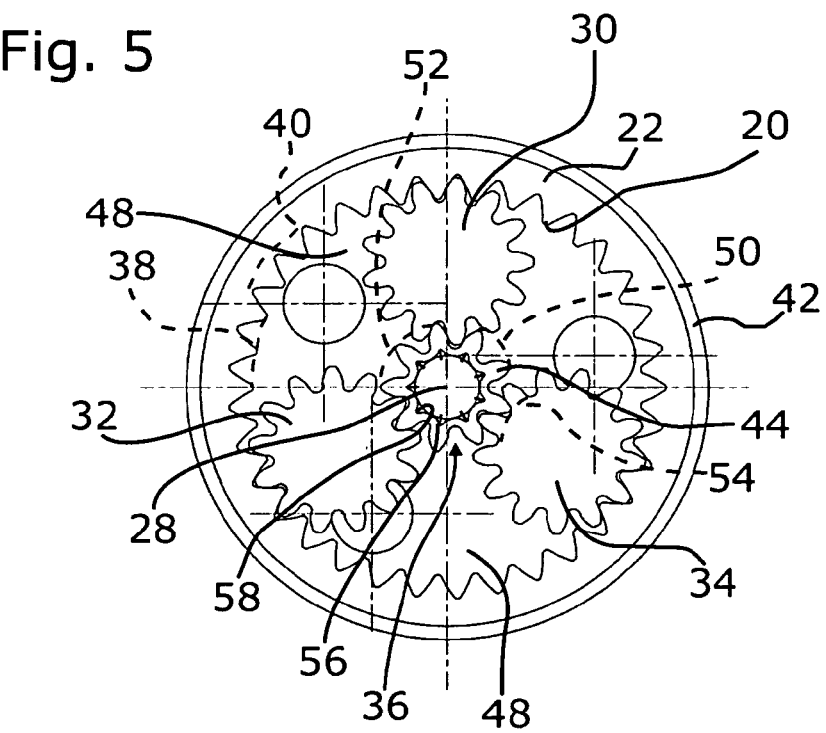
FIG. 5: is a view along the sectional plane V-V in FIG. 4.

In the second exemplary embodiment, which is illustrated in the FIGS. 4 and 5, the sun wheel is elastic again. Now, the first ring-shaped spring 44 however extends over the entire axial length of the prior art sun wheel, meaning, it has the same thickness as the planet wheels 30-34 for example. It forms the entire toothed surface of the sun wheel 36. A driving part 46 is associated with the first ring-shaped spring 44, the driving part now acting in its interior and not being separate and axially offset like in the first exemplary embodiment shown in the FIGS. 1 through 3. In the second exemplary embodiment, the first ring-shaped spring 44 forms an inner driver region 56 that is out of round. It engages an outer driver region 58 of the hinge shaft 29. This engagement is such as to allow torque transmission in the circumferential direction, whilst the first ring-shaped spring 44 is allowed to move in the radial direction independent of the outer driver region 58. The inner driver region 56 is for example realized by a plurality of narrow strips of a constant thickness protruding, inward and towards the center, from an inner wall of the first ring-shaped spring 44. The outer driver region 58 is formed accordingly with radial slots formed radially in the hinge shaft 29. The strips are capable of moving radially with respect to the slots, but not in the circumferential direction. Other implementations are possible; rubber elements may also form the driver regions 56, 58.

In the third exemplary embodiment shown in the FIGS. 6 and 7, it is not the sun wheel 36, which is radially elastic, but one of the planet wheels, concretely, the planet wheel 30. As shown in FIG. 6, the planet wheel 30 is configured to be the second ring-shaped spring 60. The second ring-shaped spring 60 actually only differs from the first ring-shaped spring 44 in the second exemplary embodiment by the size, the two ring-shaped springs being otherwise built according to the same principle. Again, the second ring-shaped spring 60 is configured so as to be allowed to exert the radial force needed for backlash compensation, to be radially deformable while still having sufficient dimensional stability preventing it from bulging too far into the free space 48. It is possible to use the free inner space of the second ring-shaped spring 60, there may be provided a rubber body for example, a supporting body or a spring body can be disposed.

In the third exemplary embodiment, it is advantageous if the sun wheel 36 has a certain play in the radial direction. For this purpose, a bearing clearance of the hinge shaft 29 within its bearings in the external gear wheels 22, 26 may suffice. Another possibility is that the sun wheel 36 itself be configured so as to allow for radial play, this being achieved by having it built from a rigid toothed outer ring, from a rubber ring arranged on its inner side and from the hinge shaft 29 encompassed by the rubber ring, these parts being non-rotatably connected together.

It is also possible to build the radially elastic planet wheel 30, in an analogous fashion to the first exemplary embodiment, from an axially thinner, normal, that is normally mountable, rigid prior art planet wheel 30 with a second ring-shaped spring 60, which now has a smaller axial dimension than the one of FIG. 6.

The ancillary device for the first ring-shaped spring 36 is e.g., tongs with three jaws that are offset 120 degree and are movable together toward a center and for the second ring-shaped spring 60, normal tongs with two flat jaws.

In FIG. 7, there is provided a retaining means 62 in the form of an approximately trapezoidal body that prevents the ring-shaped spring 60 from bulging too much into the free space 48. The retaining body shown is disposed in proximity to the ring-shaped spring 60 and has concave limiting surfaces neighbouring the toothed surface of the ring-shaped spring 60 and of a normal planet wheel 34 and preventing the ring-shaped spring 60 from bulging too far outward into the space mentioned. The retaining body may be part of the guiding part mentioned.

Preferably, at least one of the ring-shaped springs 44, 60 is made from a material other than steel. Preferably, the other parts, namely at least one of the following parts: driving part 46, hinge axis 28, first internally toothed external gear wheel 22, second internally toothed external gear wheel 26, are made from steel, with all of the parts mentioned being preferably made from steel. A material other than steel may more specifically be titanium. As an alternative, a metal (other than titanium and steel) can be used, as long as it has high strength and sufficient elasticity module.

What is claimed is:

1. A hinge mounting for an adjustment device of a motor vehicle seat comprising:
    a first external gear wheel defining a first inner toothed surface;
    a second external gear wheel defining a second inner toothed surface and being rotatable and adjustable about a hinge axis relative to the first inner toothed surface;
    at least two planet wheels, each meshing with both the first inner toothed surface and the second inner toothed surface and being disposed for free rotation about a planet wheel axis; and
    a driving sun wheel that comprises a toothed surface and meshes with the at least two planet wheels, wherein at least one of:
    (1) at least one of the planet wheels comprises a ring-shaped spring or is formed from a ring-shaped spring, the ring-shaped spring forms at least partially the toothed surface of the planet wheel, is configured to be radially elastically deformable and designed in such a manner that the ring-shaped spring permanently exerts a force both onto the sun wheel and onto the first inner toothed surface and onto the second inner toothed surface, and
    (2) the sun wheel comprises a ring-shaped spring, the ring-shaped spring forms at least a portion of the toothed surface of the sun wheel, is configured to be radially elastically deformable and designed such that the ring-shaped spring permanently exerts a force onto the planet wheels and biases these with force into abutment with the first inner toothed surface and the second inner toothed surface;
    wherein at least one of: (1) the ring-shaped spring of the sun wheel has a diameter corresponding to the diameter of an inner circle about the hinge axis, the inner circle being tangent or intersecting dedendum circles of the planet wheels and (2) the ring-shaped spring of at least one of the planet wheels has a diameter that is equal to or slightly greater than the difference between the diameters of the dedendum circle of the sun wheel and of the dedendum circles of the inner toothed surfaces.

2. The hinge mounting as set forth in claim 1, wherein the sun wheel is divided into a ring-shaped spring and a driving part.

3. The hinge mounting as set forth in claim 1, wherein the two external gear wheels each have a concentric edge and that these edges have the same diameter and that the concentric edges are encompassed by a retainer ring.

4. The hinge mounting as set forth in claim 1, wherein the hinge axis is mounted with bearing clearance in at least one of: (1) the first external gear wheel or in a part connected therewith and (2) in the second external gear wheel or in a part connected therewith, and that this bearing clearance is greater than the entire play of the planet wheels and of the sun wheel within the inner toothed surfaces.

5. The hinge mounting as set forth in claim 1, wherein the number of teeth of the first inner toothed surface differs from the number of teeth of the second inner toothed surface and that the difference in the number of teeth is about equal to the number of the planet wheels.

6. The hinge mounting as set forth in claim 1, wherein the ring-shaped spring of the sun wheel comprises an inner driver region, that a driving part comprises an outer driver region and that the inner driver region and the outer driver region are meshing with radial clearance and are capable of transmitting a torque.

7. The hinge mounting as set forth in claim 1, wherein the ring-shaped spring has a radial travel and that a fraction smaller than one of this radial travel of the spring is needed for backlash compensation.

8. The hinge mounting as set forth in claim 1, wherein at least one toothed surface comprises curved tooth flanks and is configured to be an involute toothed surface.

9. The hinge mounting as set forth in claim 8, wherein at least one of: (1) the toothed surface of at least one of the planet wheels comprise curved tooth flanks and are preferably configured to be involute toothed surfaces and (2) the inner toothed surfaces of the two external gear wheels comprise curved tooth flanks and are preferably configured to be involute toothed surfaces.

10. A hinge mounting for an adjustment device of a motor vehicle seat comprising:
    a first external gear wheel defining a first inner toothed surface;
    a second external gear wheel defining a second inner toothed surface and being rotatable and adjustable about a hinge axis relative to the first inner toothed surface;
    at least two planet wheels, each meshing with both the first inner toothed surface and the second inner toothed surface and being disposed for free rotation about a planet wheel axis;
    a driving sun wheel that comprises a toothed surface and meshes with the at least two planet wheels, wherein at least one of:
    (1) at least one of the planet wheels comprises a ring-shaped spring or is formed from a ring-shaped spring, that the ring-shaped spring forms at least partially the toothed surface of the planet wheel, is configured to be radially elastically deformable and designed in such a manner that the ring-shaped spring permanently exerts a force both onto the sun wheel and onto the first inner toothed surface and onto the second inner toothed surface, and
    (2) the sun wheel comprises a ring-shaped spring, that the ring-shaped spring forms at least a portion of the toothed surface of the sun wheel, is configured to be radially elastically deformable and designed such that the ring-shaped spring permanently exerts a force onto the planet wheels and biases these with force into abutment with the first inner toothed surface and the second inner toothed surface; and
    retainer bodies disposed in proximity to the ring-shaped spring, the retainer bodies comprising limiting surfaces that are adjacent the toothed surface of the ring-shaped spring and prevent the ring-shaped spring from bulging too far outward into a free space formed between the planet wheels, the sun wheel and the inner toothed surface.

* * * * *